Patented Jan. 13, 1925.

1,523,308

UNITED STATES PATENT OFFICE.

EWALD STEINBUCH, OF BASEL, AND FRANZ ACKERMANN, OF BINNINGEN, NEAR BASEL, SWITZERLAND, ASSIGNORS TO SOCIETY OF CHEMICAL INDUSTRY IN BASLE, OF BASEL, SWITZERLAND.

MANUFACTURE OF CONDENSATION PRODUCTS OF THE ANTHRAQUINONE SERIES.

No Drawing.   Application filed June 10, 1924.   Serial No. 719,202.

*To all whom it may concern:*

Be it known that we, EWALD STEINBUCH, residing at Basel, Switzerland, and FRANZ ACKERMANN, residing at Binningen, near Basel, Switzerland, both citizens of the Swiss Confederation, have invented new and useful Improvements in the Manufacture of Condensation Products of the Anthraquinone Series, of which the following is a full, clear, and exact specification.

In specification No. 1,437,783 there is described a process consisting in treating amino-compounds of the anthraquinone series, the amino group of which may also be mono-substituted, with derivatives of 1.3.5-triazine halogenated in the nucleus, as for instance cyanuric chloride. There are thus obtained valuable condensation products containing 1.3.5-triazine nuclei which may be used partly as colouring matters, partly as starting materials for the production of dyestuffs.

As a result of further study and experiment on the lines of the above cited fundamental process we have found that particularly valuable products are obtained by causing amino compounds carrying at least one reactive hydrogen atom in the amino group, to react on compounds having the general formula:

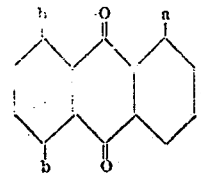

wherein the letter a represents the radical

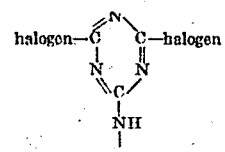

and one of the two letters b a hydrogen atom and the other the radical

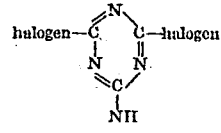

Such compounds are for instance the condensation product described in Example 15 of the said specification as obtainable from one molecular proportion of 1:5-diaminoanthraquinone and two molecular proportions of cyanuric chloride, as well as the corresponding condensation product from 1:8-diaminoanthraquinone, or from a technical mixture of both, such as is obtained by dinitrating anthraquinone and reducing the mixture of dinitro-anthraquinones produced.

There are thus obtained condensation products of the general formula:

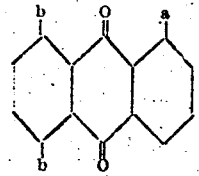

wherein the letter a represents a radical

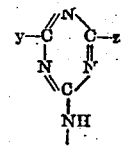

(in which y and z are substituents of which at least one is an amino radical which may be substituted), and wherein one of the two letters b indicates a hydrogen atom and the other a radical.

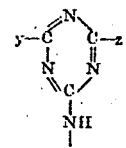

(in which y and z are substituents of which at least one is an amino radical which may be substituted), which condensation products form brownish-yellow to dark green powders which dissolve in cold concentrated sulphuric acid to yellow to bluish red-brown solutions, and in hot nitrobenzene to yellow to violet, brown and dirty green solutions. With hydrosulphite and caustic soda solution they yield red-brown to bordeaux and red-violet vats from which cotton is dyed very fast reddish-yellow to red, brown and olive tints.

These dyestuffs are also produced by causing two molecular proportions of the same or different derivatives of 1.3.5-triazine, substituted in the nucleus by halogen, which halogen may have been in part exchanged for a suitable residue, to react with one of the diaminoanthraquinones in question.

The following examples illustrate the invention, the parts being by weight:—

Example 1.

24 parts of 1:5-diaminoanthraquinone and 250 parts of nitrobenzene are heated together at about 110° C. and after addition of a solution, at 60–80° C., of 40 parts of cyanuric chloride in 150 parts of nitrobenzene the whole is heated, while stirring, at 140–145° C., for about an hour. The mixture is then cooled and the product which has separated is filtered. It is suspended in 800 parts of nitrobenzene and after addition of 65 parts of 1-aminoanthraquinone the mixture is stirred for 48 hours at 140–145° C. When cold the product which has been separated is filtered, washed with nitrobenzene and then with alcohol, and finally dried. It is a brownish-yellow powder, insoluble in water and alcohol and sparingly soluble in hot nitrobenzene to a yellow solution. Its solution in cold concentrated sulphuric acid is yellow. It yields a red-brown vat which dyes cotton strong reddish-yellow tints.

If 1:8-diaminoanthraquinone is used instead of 1:5-diaminoanthraquinone, there is obtained a dyestuff which dyes cotton in the vat beautiful, strong golden orange tints. The use of a mixture of the two diaminoanthraquinones produces a somewhat less vivid dyestuff.

Example 2.

50 parts of the dyestuff obtained as described in Example 1 are introduced into a mixture of 500 parts of aniline and 500 parts of nitrobenzene, and the mixture is heated for a long time at 140–150° C. After cooling, the condensation product is filtered, washed with nitrobenzene and alcohol and dried. It forms a brownish-yellow powder, soluble in concentrated sulphuric acid to a yellow solution and giving a red-brown vat which dyes cotton full reddish-yellow tints.

Example 3.

24 parts of diaminoanthraquinone obtained by dinitrating anthraquinone and reducing the mixture of dinitroanthraquinones produced, are introduced into 250 parts of nitrobenzene and the mixture is heated to about 110° C., and then receives an addition of 40 parts of cyanuric chloride dissolved in 150 parts of nitrobenzene, the solution being at a temperature of 60–80° C., and the whole is heated while stirring for about an hour at 140–145° C. It is then cooled and the product which has separated filtered. This product is suspended in about 800 parts of nitrobenzene and after addition of 34 parts of 4-amino-2:1-anthraquinone-acridone and 22.3 parts of 1-aminoanthraquinone, the mixture is heated to the boiling point of the nitrobenzene for six hours while stirring. After cooling, the solid matter is filtered, then washed with nitrobenzene and alcohol and dried. It is a dark green powder insoluble in water and alcohol, sparingly soluble in hot nitrobenzene to a dirty green solution. Its solution in cold concentrated sulphuric acid is reddish-brown. It yields a brown-red vat which dyes cotton yellowish-olive tints.

The use of pure 1:5- or 1:8-diaminoanthraquinone leads to a very similar condensation product

Example 4.

10 parts of the dyestuff made as described in Example 3 are introduced into 100 parts of nitrobenzene saturated in the cold with ammonia and the mixture is heated for 24 hours in a closed vessel at 150–160° C. After cooling, the mass is mixed with some alcohol and filtered and the residue on the filter is washed with alcohol and dried. This product is a greenish black powder, sparingly soluble in most organic solvents. In concentrated sulphuric acid it dissolves to a red-brown solution. It forms a brownish-red vat, which dyes cotton brownish-olive tints.

Example 5.

15 parts of the dyestuff obtained as described in Example 3 are introduced into a mixture of 500 parts of aniline and 500 parts of nitrobenzene, and the whole is heated for a long time at 140–150° C. After cooling, the condensation product is filtered, washed with nitrobenzene and with alcohol and dried. It is a greenish-black powder which dissolves in concentrated sulphuric acid to a red-brown solution and yields a brownish-red vat dyeing cotton full brownish-olive tints.

Example 6.

24 parts of diaminoanthraquinone obtained by dinitrating anthraquinone and reducing the nitration product produced are introduced, together with 40 parts of cyanuric chloride, into about 400 parts of nitrobenzene and the whole is heated for an hour at 140–145° C. After cooling the separated product is filtered. It is now stirred into about 800 parts of nitrobenzene and after addition of 68 parts of 4-amino-2:1-anthraquinone-acridone, the mixture is heated for eight hours to the boiling point of nitrobenzene. 22 parts of 1-aminoanthraquinone are then added and the heating to boiling continued for 12 hours. After cooling the condensation product thus obtained is filtered, washed and dried. It is a green-black power, insoluble in water and alcohol and sparingly soluble in hot nitrobenzene to a dirty green solution. Its solution in cold concentrated sulphuric acid is reddish-brown. It yields a brown-red vat dyeing cotton bluish-olive tints.

*Example 7.*

24 parts of diaminoanthraquinone made by dinitrating anthraquinone and reducing the nitration product thus obtained, are introduced together with 40 parts of cyanuric chloride into about 400 parts of nitrobenzene and the whole is heated for an hour at 140–145° C. After cooling the separated product is filtered. It is stirred into about 800 parts of nitrobenzene and after addition of 34 parts of 4-amino-2:1-anthraquinone-acridone and 36 parts of 4-amino-2:1-anthraquinonethioxanthone the whole is heated for 6 hours to the boiling point of the nitrobenzene. After cooling the condensation product thus obtained is filtered, washed and dried. It is a blackish powder, insoluble in water and alcohol, sparingly soluble in hot nitrobenzene to a violet solution and soluble in cold concentrated sulphuric acid to a brown-red solution. Its bordeaux-coloured vat dyes cotton dark olive shades.

*Example 8.*

24 parts of diaminoanthraquinone obtained by dinitrating anthraquinone and reducing the nitration product, are introduced together with 40 parts of cyanuric chloride into about 400 parts of nitrobenzene, and the mixture is heated for an hour at 140–145° C. After cooling, the separated product is filtered. It is stirred into about 900 parts of nitrobenzene, and after addition of 72 parts of 4-amino-2:1-anthraquinonethioxanthone the whole is heated for 8 hours to the boiling point of the nitrobenzene. After cooling the finished condensation product is filtered, washed and dried. It is a dark violet powder, insoluble in water and alcohol, sparingly soluble in hot nitrobenzene to a violet solution and soluble in cold concentrated sulphuric acid to a brownish blue-red solution. Its vat is red-violet and dyes cotton brownish-red tints.

*Example 9.*

24 parts of diaminoanthraquinone made by dinitrating anthraquinone and reducing the nitration product, are introduced together with 40 parts of cyanuric chloride into about 400 parts of nitrobenzene and the mixture is heated for an hour at 140–145° C. After cooling, the separated product is filtered. It is introduced into 800 parts of nitrobenzene and after addition of 35 parts of 4-amino-2:1-anthraquinone-thioxanthone and 22 parts of 1-aminoanthraquinone the whole is heated, while stirring, for about 7 hours to the boiling point of the nitrobenzene. After cooling, the finished condensation product is filtered, washed and dried. It is a brown powder, insoluble in water and alcohol, sparingly soluble in cold concentrated sulphuric acid to a reddish-brown solution. Its vat is red-brown and dyes cotton brown tints.

*Example 10.*

24 parts of diaminoanthraquinone made by dinitrating anthraquinone and reducing the nitration product, are introduced together with 40 parts of cyanuric chloride into about 400 parts of nitrobenzene, and the whole is heated for an hour at 140–145° C. After cooling, the separated product is filtered. It is suspended in about 700 parts of nitrobenzene and after addition of 69 parts of monobenzoyl-1:4-diaminoanthraquinone the whole is heated for 24 hours at 150–160° C. while stirring. The mixture is then allowed to cool and the finished condensation product filtered, washed and dried. It is a brown-red powder insoluble in water, sparingly soluble in boiling alcohol and in hot nitrobenzene to a bluish-red solution and soluble in cold concentrated sulphuric acid to a blue-red solution. Its brown-red vat dyes cotton copper tints.

*Example 11.*

223 parts of 1-aminoanthraquinone are introduced together with 185 parts of cyanuric chloride into about 2,500 parts of nitrobenzene and the mixture is heated at 130° C., while stirring, for about ½ hour. After cooling the mixture is filtered and the solid matter is washed and dried. 75 parts of this product and 24 parts of 1:8-diaminoanthraquinone are introduced into 1,000 parts of nitrobenzene and the mixture is boiled in a reflux apparatus for 6 hours. After cooling, the product is filtered, washed with alcohol and dried. It is a yellow powder soluble in suphuric acid to a yellow solution and yielding a red-brown vat which dyes cotton fast reddish-yellow tints.

In all these examples there can be used, as already stated, either the pure 1:5- or 1:8-diaminoanthraquinone, or a technical mixture of both. The order in which the operations are performed and the molecular proportions can be varied within certain limits. Instead of the amino-compounds named in the examples others can obviously be used, such as primary and secondary alkyl-, aralkyl- and arylamines, as well as other aminoanthraquinone derivatives, such as halogen aminoanthraquinones and hydroxy-aminoanthraquinones and their derivatives.

What we claim is:—

1. The process for the manufacture of condensation products of the anthraquinone series, consisting in causing amino-compounds carrying at least one reactive hydrogen atom in the amino-group, to react on compounds of the general formula:

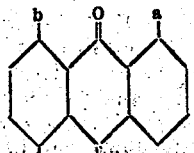

wherein the letter a represents the radical

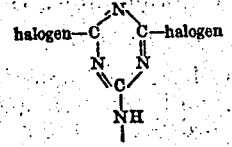

and one of the two letters b a hydrogen atom and the other the radical halogen—C C—halogen 2. The process for the manufacture of condensation products of the anthraquinone series, consisting in causing aromatic amino-compounds carrying at least one reactive hydrogen atom in the amino-group, to react on compounds of the general formula:

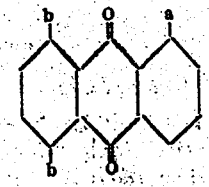

wherein the letter a represents the radical

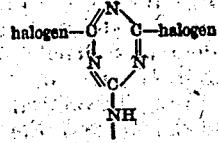

and one of the two letters b a hydrogen atom and the other the radical halogen—C C—halogen 3. The process for the manufacture of condensation products of the anthraquinone series, consisting in causing at least two molecular proportions of aromatic amino-compounds carrying at least one reactive hydrogen atom in the amino-group, to react on one molecular proportion of a compound of the general formula:

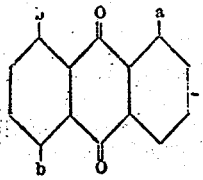

wherein the letter a represents the radical

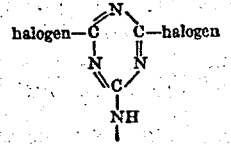

and one of the two letters b a hydrogen atom and the other the radical

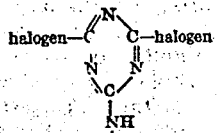

4. The process for the manufacture of condensation products of the anthraquinone series, consisting in causing at least two molecular proportions of compounds of the anthraquinone series carrying primary amino-groups, to react on one molecular proportion of a compound of the general formula:

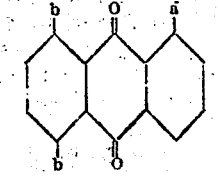

wherein the letter a represents the radical

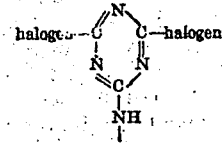

and one of the two letters b a hydrogen atom and the other the radical

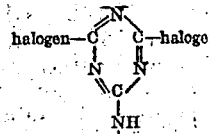

5. The herein described products of the general formula:

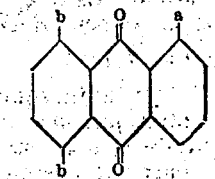

wherein the letter a represents a radical

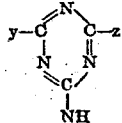

(in which y and z are substituents of which at least one is an amino-radical which may be subsituted), and wherein one of the two letters b represents a hydrogen atom and the other a radical

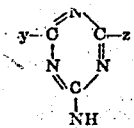

(in which y and z are substituents of which at least one is an amino radical which may be substituted), which products form brownish-yellow to dark green powders which dissolve in cold concentrated sulphuric acid to yellow to bluish-red-brown solution, and in hot nitrobenzene to yellow to violet, brown and dirty green solutions, yielding with hydrosulphite and caustic soda solution red-brown to bordeaux and red-violet vats from which cotton is dyed very fast reddish-yellow to red, brown and olive tints.

6. The herein described products of the general formula:

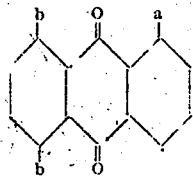

wherein the letter a represents a radical

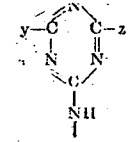

(in which y and z are substituents of which at least one is an arylamino radical), and wherein one of the two letters b represents a hydrogen atom and the other a radical

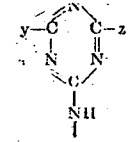

(in which y and z are substituents of which at least one is an arylimino radical), which products form brownish-yellow to dark green powders which dissolve in cold concentrated sulphuric acid to yellow to bluish red-brown solutions, and in hot nitrobenzene to yellow to violet, brown and dirty green solutions, yielding with hydrosulphite and caustic soda solution red-brown to bordeaux and red-violet vats from which cotton is dyed very fast reddish-yellow to red, brown and olive tints.

7. The herein described products of the general formula:

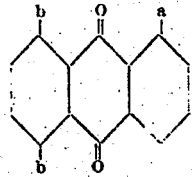

herein the letter a represents a radical

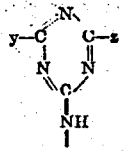

(in which y and z are substituents of which at least one is an arylamino radical which contains an anthraquinone nucleus), and wherein one of the two letters b represents a hydrogen atom and the other a radical

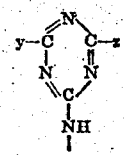

(in which y and z are substituents of which at least one is an arylamino radical which contains an anthraquinone nucleus), which products form brownish-yellow to dark green powders which dissolve in cold concentrated sulphuric acid to yellow to bluish red-brown solutions, and in hot nitrobenzene to yellow to violet, brown and dirty green solutions, yielding with hydro sulphite and caustic soda solution red-brown to bordeaux and red-violet vats from which cotton is dyed very fast reddish-yellow to red, brown and olive tints.

8. The herein described products of the general formula:

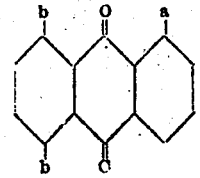

wherein the letter a represents a radical

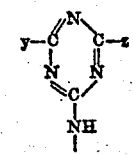

(in which y and z are substituents of which at least one is an amino-anthraquinone radical), and wherein one of the two letters b represents a hydrogen atom and the other a radical

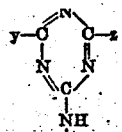

(in which y and z are substituents of which at least one is an amino-anthraquinone radical), which products form brownish-yellow powders which dissolve in cold concentrated sulphuric acid and in hot nitrobenzene to a yellow solution, yielding with hydrosulphite and caustic soda solution red-brown vats from which cotton is dyed reddish-yellow to orange tints.

In witness whereof we have hereunto signed our names this 26th day of May, 1924, in the presence of two subscribing witnesses.

EWALD STEINBUCH.
FRANZ ACKERMANN.

Witnesses:
MADELEINE SPENGLER,
JULIA A. DURST.